Aug. 1, 1950  H. P. STAATS  2,517,361
AUTOMATIC BURDEN RELEASE FOR CARGO PARACHUTES
Filed Dec. 26, 1945
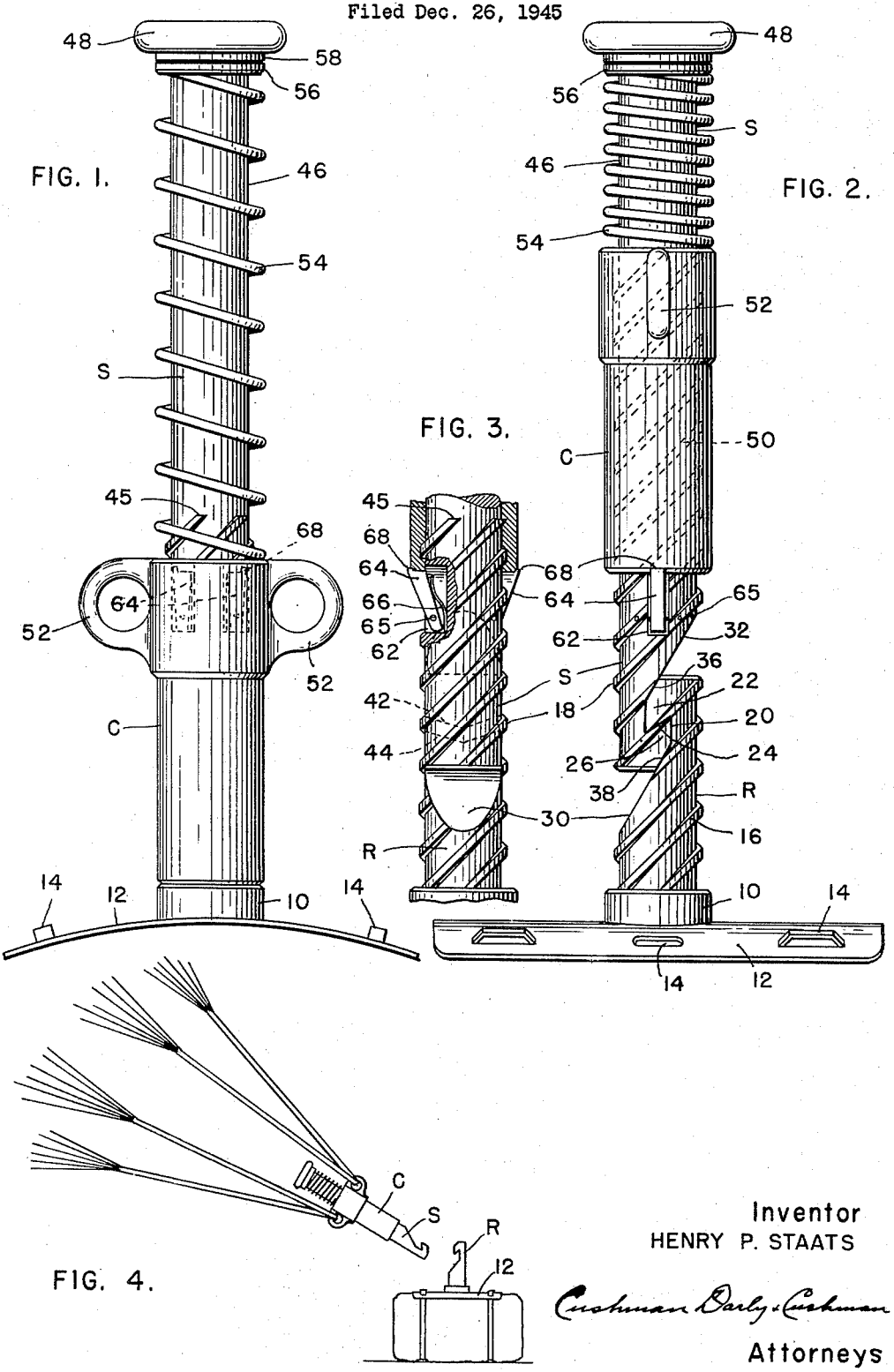
Inventor
HENRY P. STAATS
Cushman Darby & Cushman
Attorneys Patented Aug. 1, 1950

2,517,361

UNITED STATES PATENT OFFICE 2,517,361

AUTOMATIC BURDEN RELEASE FOR CARGO PARACHUTES

Henry P. Staats, Charleston, S. C.

Application December 26, 1945, Serial No. 637,270

3 Claims. (Cl. 294—83)

The present invention relates to apparatus for supporting a load from a parachute in such manner that the load will be automatically released when the parachute assembly reaches the earth.

A principal object of the invention is to provide such an apparatus capable of sure and instantaneous release of the load when it reaches the earth, but having means to prevent premature release, for instance, at the time when the parachute is discharged from the aircraft. That is, the apparatus comprises automatically operable mechanism which prevents the releasing device from being unlocked until the parachute is in full descent toward the earth.

A further object of the invention is to provide such an apparatus characterized by the simplicity of its operation and manufacture.

In the drawings which are illustrative of one form which the invention may take, and which are not intended to restrict the invention:

Figure 1 is a side elevational view of the apparatus in its unloaded condition, or in the condition the apparatus assumes shortly after the parachute is discharged from the aircraft but before it is in full descent toward the earth.

Figure 2 is another side elevational view of the apparatus viewed from a position at 90° from that of Figure 1, and showing the apparatus in the loaded condition, or the condition the apparatus assumes when the parachute is in full descent toward the earth.

Figure 3 is a side elevational view of a portion of the apparatus in the condition of Figure 2, partly in section, the view being taken looking inwardly from the left side of Figure 2.

Figure 4 is a diagrammatic view generally illustrating the manner in which the mechanism operates to release the load when the latter reaches the surface of the earth.

The general construction of the apparatus is best shown in Figures 1 and 2, the main elements comprising a carrier consisting of a lower load carrying member or rod R, an aligned upper or supporting member or rod S, and a control member or yoke in the form of a sleeve C.

The load carrying member R may be equipped in any suitable manner to carry the load or burden, and in the drawings I have shown it secured to a collar 10 which is in turn welded or otherwise connected with a semi-cylindrical saddle 12 which has cut-out openings or brackets 14 to receive suitable straps to lash the load to the saddle.

The load supporting member is substantially cylindrical in form, and is provided with a flight of relatively heavy exterior screw threads 16 which are of the same pitch and constitute a continuation of similar threads 18 on the upper supporting member S, the threads continuing through a connecting releasable joint between the two members as hereinafter described.

The supporting member is inwardly cut away on one side as at 20 (Figure 2) to form a hook member 22, and the upper member S is similarly cut out as at 24 to form a cooperating hook member 26. The lower part of the cut-out portion of the member R comprises a relatively long gradual tapering surface 30, and similarly, the upper portion of the cut-out of the member S is a tapered surface 32, so that extensive open spaces are left above the hook 22 and below the hook 26 to permit easy disengagement of the hooks when the load reaches the surface of the earth. As is evident from Figure 2, when the load is suspended, the construction of the connection or joint is such that the lower member is in alignment with the upper member, each hook having engaging surfaces 36 and 38 which form aligning supports in their respective engagement with surfaces 32 and 30 of the opposite hooks. The lower end of surface 32 and the upper end of surface 30 terminate in substantially vertical surfaces, as shown in Figure 2, which engage and closely fit corresponding surfaces on the sides of the hook which they engage. The arrangement disclosed is such as to provide a firm connection which maintains the members and their threads in proper alignment. While the precise details of the apparatus may be varied, I have found an arrangement suitable wherein the surfaces 30 and 32 are at an angle of about 60 degrees with the horizontal. Similarly, the threads 16 and 18 may be at an angle of about 45 degrees from the horizontal.

Referring to Figure 3, it will be observed that the joint or connection between the two members is of shallow V-shape looking in a direction at right-angles to the view of Figure 2, this being indicated by the dotted lines 42 and 44 which indicate respectively the upper edge of the hook 26 and the lower edge of the hook 22, this feature of the connection further serving to insure against premature release of the connection, as well as proper alignment of the members during descent.

From the above description, it will be apparent that as the parachute descends, the load is supported by the saddle 12 with the rods R and S in alignment and releasably connected as illustrated in Figure 2. The parachute is connected with the upper member S in a manner hereinafter described, so that when the load reaches the surface of the earth the hook 26 will be disengaged from the opening in the rod R beneath the hook 22 and will be carried away by the parachute as illustrated in Figure 4. Thus, a load dropped from the aircraft will not be dragged away from the spot on the ground where it is intended to land the same, or in the case of air-sea-rescue work, the parachute will not carry the load away from the scene of rescue by acting as a sail connected with the load.

The upper member S is exteriorly threaded for approximately one-third of its length terminating at about point 45, its upper portion 46 being of smooth surface and terminating in an enlarged collar 48. The control member or yoke C is in the form of a sleeve, which is interiorly threaded as at 50 with heavy threads of the same pitch as those on the members R and S. The control member is equipped with suitable means, such as integral eyes or rings 52, for attachment of the shrouds leading to the body of the parachute. The carrier and the control member are mounted for longitudinal and rotational movement with respect to one another, and by comparing Figures 1 and 2, it will be evident that the control member is capable of relative upward movement from the position of Figure 1 where it covers the releasable connection between the rod R and the rod S to a position where said connection is uncovered. Thus, the control member is adapted by its position, to control the locking or unlocking of the releasable connection between the two members of the carrier.

A compression spring 54 of relatively heavy construction is mounted on the upper portion 46 of the rod S. This spring bears at its lower end against the upper end of the sleeve C, and it has a thrust bearing 56 which facilitates turning against the thrust of the spring 54. The compression spring has a normal tendency to maintain the control member C in the lower position of Figure 1, or stated in another way, the spring tends to move the carrier comprising the aligned members R and S upwardly with respect to the sleeve C. The relative movements referred to are governed by the weight of the load which tends to move the carrier rods R and S downwardly, whereas the parachute when in full descent, exerts a restraining influence on the control sleeve causing it to be the stable member with respect to which the relative movements take place.

The supporting member S is provided with opposite slots 62 at a point along its threaded length between its hook 26 and the upper termination of its threaded section, and pawls 64 are housed in said slots, said pawls being pivoted on suitable pins 65 as shown, and being normally biased outwardly at their upper ends by leaf springs 66 positioned in the slots behind the pawls. In the position of Figure 1, the pawls are completely housed in their slots, whereas in the position of the device in Figure 2, the pawls have dropped outwardly from their slots, so that their upper edges 68 lock yoke C against further downward relative movement.

The operation of the apparatus is substantially as described below, it being understood that the device will not assume its condition to release the load until a time has elapsed after its discharge from the aircraft adequate for the parachute to be in full descent and clear of parts of the aircraft which might cause premature release.

When the apparatus is ready for release, the burden is lashed tight in the saddle 12 and the parachute shroud lines are attached to the rings 52 in the yoke C. At this time the yoke totally encloses the union or connection of the hooks 22 and 26 and the yoke is retained in this position by the spring 54 acting between the top 48 of the yoke and the top of the control member, this position being illustrated in Figure 1.

When the assembly is thrown from the aircraft, the parachute opens and exerts an initial pull of great intensity on the yoke C through the shroud lines. The immediate effect of this tension is to drive the carrier downwardly through the yoke as a result of the inertia of the load attached to the saddle, but this movement is delayed by the necessary rotation of the carrier in the yoke required by the engaging screw threads, and is resisted by the spring 54. Because of this delay, the carrier will only have moved downwardly through the yoke approximately one turn of the threads before the initial strain exerted by the opening of the parachute is dissipated, and the movement will not have been sufficient to uncover the connection between the rods R and S. When this initial strain is terminated, there follows a short period of substantially negative load during which time the spring may return the parts substantially to their fully closed position of Figure 1.

When the parachute has reached a stable condition in its descent toward the earth, and at a time when it has cleared the aircraft, the weight of the load begins to have its normal operational effect on the apparatus. That is, the weight of the load is such with respect to the strength of the spring 54 that it causes the carrier comprising rods R and S to move downwardly with respect to the yoke, it being evident that the carrier will unthread itself from the yoke under the weight of the burden and in opposition to the effect of the spring and the friction of the threads. This relative movement is permitted to take place as the yoke is now the relatively stable member of the apparatus, being restrained against other than normal movement of descent by its rigid connection with the shrouds of the parachute.

The relative movement of the parts is such that the connection between the rods R and S is entirely uncovered or unlocked as in Figure 2, and the parts finally reach an extended position wherein the pawls 64 are released and latch beneath the lower end of the yoke C. The pawls thereafter retain the apparatus with the connection uncovered or unlocked. When the load strikes the ground, the connection between the rods R and S is such that their hooks are immediately disengaged as shown in Figure 4, the parachute carrying the rod C and its hook away from the rod R. The burden will thus be left at the point where the descent of the parachute terminates.

It will be apparent from the above that I have provided a load releasing device of great simplicity yet which is sure and safe in its operation. It will be further evident that the apparatus is such as to preclude premature release of the load, the parts not being positioned or armed for release until the parachute has assumed full descent toward the earth. It will be obvious from the above description that the parts are all of simple construction and can be quickly and cheaply manufactured. Furthermore, the apparatus is not confined to use with cargo of special size or shape, as the saddle will receive any type of load, the device also being properly operable with loads of varying weight within limits of its spring.

I claim:

1. A load release for parachutes comprising a carrier rod having upper and lower sections connected by a releasable joint, said lower section having means for attachment of the load, and a control yoke initially positioned over said joint to lock the same against release, said yoke having means for connection with the shrouds of the parachute, said carrier and said yoke being connected by threads of relatively great pitch to permit relative movement of the carrier with respect to the yoke when the parachute is descending to the earth, whereby the weight of the load will expose said joint for release after the parachute is in full descent toward the earth.

2. A construction in accordance wtih claim 1, wherein a spring pressed pawl is carried by the carrier rod and is held in inoperative position when said yoke covers said joint, said pawl being adapted to be released to engage beneath said yoke and retain same in position exposing said joint.

3. A load release for parachutes comprising a carrier rod having upper and lower sections connected by a releasable joint, said rod being provided with relatively heavy threads which extend across said joint, and a control yoke initially positioned over said joint to lock the same against release and having means for connection with the shrouds of the parachute, said yoke having threads engaging the threads on the upper and lower sections of said carrier rod and across said joint to permit unthreading of the carrier with respect to the yoke when the parachute is descending to the earth whereby the weight of the load will expose said joint for release when the load reaches the earth.

HENRY P. STAATS.

REFERENCES CITED

The following references are of record in the file of this patent:

UNITED STATES PATENTS

| Number | Name | Date |
| --- | --- | --- |
| 1,845,466 | Williams | Feb. 16, 1932 |
| 2,386,932 | Cooper | Oct. 16, 1945 |
| 2,400,165 | Porter | May 14, 1946 |
| 2,410,816 | Frieder et al. | Nov. 12, 1946 |

FOREIGN PATENTS

| Number | Country | Date |
| --- | --- | --- |
| 118,090 | Australia | Feb. 2, 1944 |